T. COOK.
GASEOUS FUEL MIXER.
APPLICATION FILED FEB. 27, 1913.
1,078,834.
Patented Nov. 18, 1913.
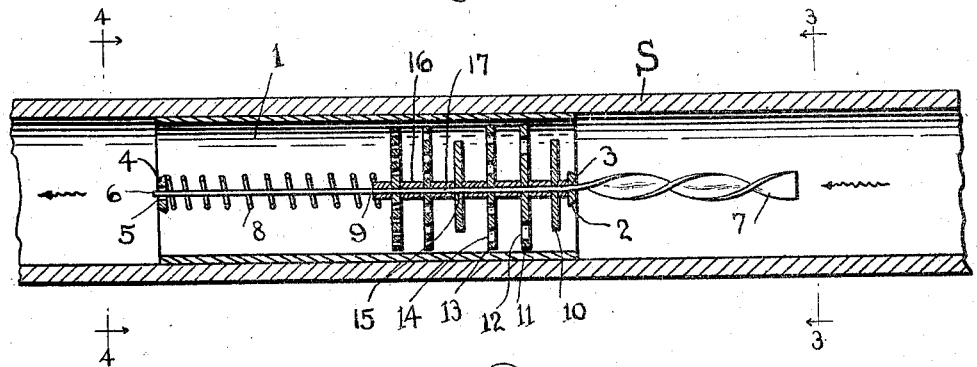
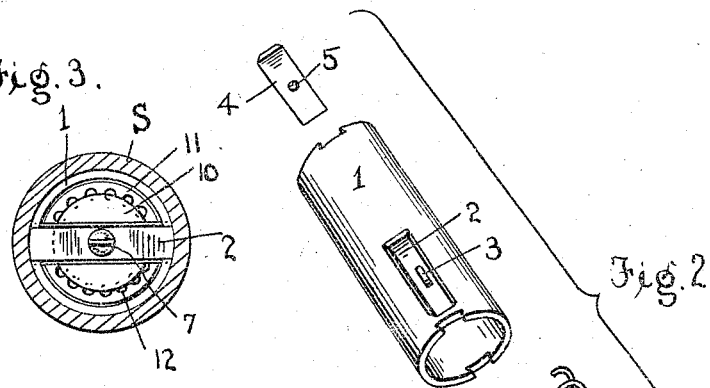
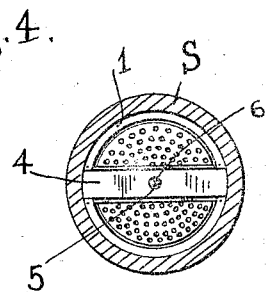
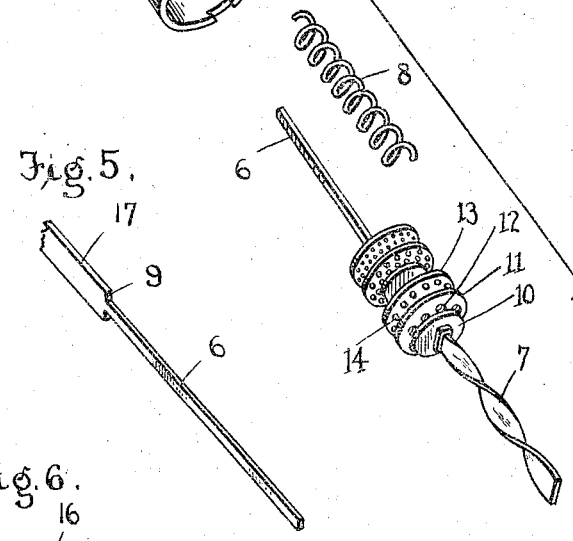
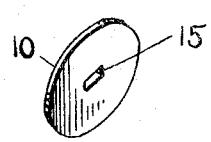
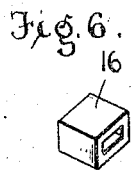
Inventor
Thomas Cook
Witnesses
By
Attorneys

UNITED STATES PATENT OFFICE.

THOMAS COOK, OF INDIANA, PENNSYLVANIA.

GASEOUS-FUEL MIXER.

1,078,834.  Specification of Letters Patent.  Patented Nov. 18, 1913.

Application filed February 27, 1913. Serial No. 751,036.

*To all whom it may concern:*

Be it known that I, THOMAS COOK, a citizen of the United States, residing at Indiana, in the county of Indiana and State of Pennsylvania, have invented certain new and useful Improvements in Gaseous-Fuel Mixers; and I do declare the following to be a full, clear, and exact description of the invention, such as will enable others skilled in the art to which it appertains to make and use the same.

This invention relates to gas, either artificial or natural, and more especially to the devices for mixing air and gas so that perfect combustion may ensue; and the object of the same is to produce an automatic mixer preferably disposed within the service pipe and automatically actuated by variations in the pressure, so that the gas when it reaches the burners where it is to be consumed will be thoroughly mixed with the air which it contains. This object is carried out by constructing the mixer in the manner hereinafter more fully described and claimed, and as shown in the drawings wherein—

Figure 1 is a longitudinal section of this device in place within a service pipe. Fig. 2 is a view showing all parts of the device in perspective as disconnected and detached from each other. Figs. 3 and 4 are cross sections on the lines 3—3 and 4—4 respectively of Fig. 1. Figs. 5, 6 and 7 are perspective details of parts.

Most gas used for illuminating and heating purposes needs a considerable proportion of air mixed with it before it will burn thoroughly, equally, constantly, and satisfactorily. For heating purposes this air is mixed with the gas liberally so as to produce what is known as the "blue" flame having extreme heat and giving off not much light. For illuminating purposes the air and gas are purposely mixed when the gas is manufactured, the object being to charge the gas with as large a proportion of air as is possible and yet produce good results. With natural gas, however, the proportion of air and gas varies for different wells and at different times and under different conditions, and it is well known that the pressure varies almost constantly.

The purpose of the present invention is to introduce into the service pipe between the gas main and the various points of consumption within a building, an automatic gas mixer or agitator, actuated by the variations in pressure, whereby the air contained within the gas may be thoroughly mixed with it as the fluid passes the mixer.

Coming now more particularly to the details of construction as illustrated in the drawings herewith, the numeral 1 designates a casing which is preferably a piece of tube of light brass or copper; and if the present invention is made in sizes to fit service pipes of various sizes, as I prefer, this casing will be of the proper diameter and of a length proportionate thereto. Both ends of the casing are open, and across the inlet end is a spider or bridge 2 having through its center a slot 3, while a similar spider or bridge 4 is secured across its inner or outlet end and provided with a hole 5 at its center. These bridges may be separate pieces of metal, or they may be cut from the sheet metal of which the casing is composed, at the time it is stamped, and bent across the ends of the same and soldered or brazed in place in any suitable manner. Disposed within and along the axis of said casing is a shank which may well be made from a light strip of sheet metal, initially flat throughout its length, reduced in width for about a third of its length so as to form what might be termed a pin 6 which plays freely through the hole 5, and the remote end of its remaining portion is given a twist 7 which plays freely through the slot 3. Around the pin 6 is disposed an expansive coiled spring 8, between the inner face of the bridge 4 and the shoulder 9 which is located between the pin 6 and the larger portion of the shank. I might say at this point that if the entire device is disposed in an upright service pipe, the spring might be omitted, but in any case its force must be such as to normally overcome the ordinary pressure or flow of the gas, but to yield to the same during increases or pulsations in it. Mounted on the shank as thus constructed is a group of disks. As shown in the drawings there are six, the first toward the inlet end of the casing being solid as seen at 10 and peripherally somewhat smaller than the interior diameter of the casing so that in effect it forms a spreader; the next disk 11 being provided with rather large holes 12, the next disk 13 being in turn pierced with a series of smaller holes 14, and the three other disks duplicating the arrangement and construction just described. Peripherally the perforated disks are by preference only slightly smaller than the bore of the casing, so that there is little or no escape for the fluid around their edges, and it is therefore forced to pass through their perforations; but the spreader disks compel the fluid to pass around their edges as will be clear. This group of disks therefore constitutes an agitator because it creates a number of tortuous passages or channels throughout the length of the casing and along which the fluid must flow. Said disks may be mounted on the shank in any suitable manner, but by preference I provide them with slots 15 at their centers of a size to closely embrace the shank 17 between its shoulder 9 and the inner end of its twist 7, and between each two disks a collar 16 of any suitable material and size is closely engaged with said shank so as to hold the disks separated from each other. However, any other suitable arrangement for holding the disks on the shank might be adopted.

In use this device is inserted within a service pipe S near the meter and on either side thereof, but between the gas main and the point of consumption, and the service pipe closed to the external air. When now the gas flows through this pipe the pulsations or variations in the pressure constantly move the shank and its disks longitudinally within the guides formed by the slot 3 and the hole 5, and as it moves the slipping of the twist 7 through said slot causes it to rotate to an extent dependent upon the pitch. The gas and air passing the bridge 2 are thrown outward by the first deflector plate, then passed through the larger holes in the first perforated plate and the smaller holes in the second perforated plate, are then thrown outward again by the next deflector plate, and repeat the operation through the last two perforated plates, and might repeat it again if the group were duplicated. I find by experience that the agitation thus imparted to the fluid causes the automatic mixture of the pure gas and the air which the fluid contains, with the result that by the time it reaches the point of combustion it burns with a steady flame as is not the case where gas—and especially natural gas—is permitted to flow direct to the burner.

While I have illustrated the device as disposed within a horizontal service pipe S, it is obvious that it might be placed in an upright service pipe, and as above suggested the spring might then be omitted.

The materials and proportions of parts are not essential, nor is the number or exact construction of the disks.

What is claimed as new is:

1. A mixer for the purpose set forth consisting of a tubular casing through which passes the fluid to be mixed, a shank movably disposed along the axis of said casing, yielding means bearing it normally toward the inlet of the fluid, means for imparting rotation to the shank when moved in either direction, and agitating devices carried by said shank.

2. A mixer for the purpose set forth consisting of a tubular casing through which passes the fluid to be mixed, a shank movably disposed longitudinally in said casing, yielding means for bearing it normally toward the inlet of the fluid and simultaneously imparting rotation to it, a group of disks disposed upon said shank and provided with holes of various sizes, imperforate spreaders also strung upon the shank and forming part of said group, and spacing collars fast around the shank between the various disks.

3. In a mixer of the class described, the combination with a tubular casing having bridges across its extremities, one pierced with a slot and the other with a hole; of a shank having a pin at one end movably mounted within said hole and a twist at the other end movably engaging said slot, and agitating devices carried by said shank between its pin end and its twist end.

4. In a mixer of the class described, the combination with a tubular casing having bridges across its extremities, one pierced with a slot and the other with a hole; of a shank having a pin at one end movably mounted within said hole and a twist at the other end movably engaging said slot, a shoulder formed between the pin end and the body of said shank, a spring surrounding the pin between said shoulder and the bridge having the hole through its body, and an agitator mounted on the shank between its pin end and its twisted end.

5. In a mixer of the class described, the combination with a tubular casing having bridges across its extremities, one pierced with a slot and the other with a hole; of a shank having a pin at one end movably mounted within said hole and a twist at the other end movably engaging said slot, a shoulder formed between the pin end and the body of the shank, a spring surrounding the pin between said shoulder and the bridge having a hole through its body, a group of disks having perforations of different sizes through their bodies and slots through their centers strung on the shank between its pin end and its twisted end, and collars surrounding this portion of the shank between said disks.

6. In a mixer of the class described, the combination with a tubular casing having bridges across its extremities, one pierced with a slot and the other with a hole; of a shank having a pin at one end movably mounted within said hole and a twist at the other end movably engaging said slot, a group of disks having perforations of different sizes through their bodies and slots through their centers strung on the shank, collars surrounding this portion of the shank between said disks, and a spring between the innermost disk and the bridge having the hole, for the purpose set forth.

7. In a mixer of the class described, the combination with a tubular casing having bridges across it, one pierced with a slot and the other with a hole; of a shank movably mounted within said hole and having a twist movably engaging said slot, and agitating devices carried by said shank between its pin end and its twisted end.

In testimony whereof I have hereunto set my hand in presence of two subscribing witnesses.

THOMAS COOK.

Witnesses:
H. A. BOGGS,
S. V. DYE.